United States Patent [19]

Schmit

[11] Patent Number: 5,489,166
[45] Date of Patent: Feb. 6, 1996

[54] METHOD AND DEVICE FOR REMOVING SOLID RESIDUES FROM A GAS PURIFICATION INSTALLATION

[75] Inventor: Louis Schmit, Grand Duchy, Luxembourg

[73] Assignee: Paul Wurth, Luxembourg

[21] Appl. No.: 181,563

[22] Filed: Jan. 13, 1994

[30] Foreign Application Priority Data

Jan. 13, 1993 [LU] Luxembourg ............... 88210
Nov. 3, 1993 [LU] Luxembourg ............... 88421

[51] Int. Cl.$^6$ .................................................. B65G 53/38
[52] U.S. Cl. ............................ 406/137; 406/124; 34/360; 34/367
[58] Field of Search ............................ 406/32, 122, 124, 406/136, 137, 138; 34/360, 367

[56] References Cited

U.S. PATENT DOCUMENTS

| 2,221,741 | 11/1940 | Vogel-Jorgensen | 406/137 |
|---|---|---|---|
| 2,707,132 | 4/1955 | Baresch | 406/137 |
| 3,190,867 | 6/1965 | Oldweiler et al. | 34/360 |
| 3,230,016 | 1/1966 | Gilbert et al. | 406/124 |
| 3,937,521 | 2/1976 | Reuter | 406/124 |
| 4,170,074 | 10/1979 | Heckman et al. | 406/136 |
| 4,693,189 | 9/1987 | Powers | 406/137 |
| 4,955,989 | 9/1990 | Mink | 406/124 |

FOREIGN PATENT DOCUMENTS

| 1123433 | 9/1956 | France . |
|---|---|---|
| 2375562 | 7/1978 | France . |
| 1137056 | 9/1962 | Germany . |
| 3315067A1 | 10/1984 | Germany . |

*Primary Examiner*—Robert J. Oberleitner
*Assistant Examiner*—Gary C. Hoge
*Attorney, Agent, or Firm*—Fishman, Dionne & Cantor

[57] ABSTRACT

A method and device for removing solid residues from a gas purification installation are presented. After discharge of a batch of solid residues into a first closed vessel, the vessel is isolated with respect to the gas purification installation. At least one pressurized purge gas is then passed through this batch of solid residues, so as to create a static or fluidized bed of the solid residues. The purge gases are then removed in a controlled manner from the first closed vessel. The solid residues are removed into a transport pipe and are transported through the pipe in suspension in a pressurized gas.

22 Claims, 5 Drawing Sheets

METHOD AND DEVICE FOR REMOVING SOLID RESIDUES FROM A GAS PURIFICATION INSTALLATION

BACKGROUND OF THE INVENTION

This invention relates generally to gas purification installations. More particularly, this invention relates to a method and an installation for removing granular or pulverulent solid residues from an installation for purifying gases, especially blast furnace gases.

Installations for purifying gases, especially blast furnace gases, are known, in which the granular or pulverulent solid pollutants are separated from the gaseous phase using dry separators such as, for example, dust bags, cyclones, sack filters and electrostatic filters. These solid residues are collected in hoppers installed directly below the dry separators.

These hoppers, which need to be emptied regularly, have hitherto discharged the solid residues freely, either directly into lorry containers or wagons, or simply onto a pile below the hoppers to be subsequently loaded by mechanical shovels onto wagons or lorries. The lorries then remove the solid residues to an intermediate storage area. It will be noted that the solid residues separated from the blast furnace gases mainly consist of iron and coke dust which, under certain conditions, can be advantageously recycled in an agglomeration installation or can be reinjected directly into the blast furnace.

The operation of removing the solid residues from the filter hoppers is, in the current state of the art, essentially a discontinuous handling operation which has major disadvantages. First, free tipping of pulverulent solid resides in an operation which generates a large amount of dust, which certainly leads to problems from the point of view of cleanliness of the workplace and protection of the environment. Next, pouring solid residues into free air also liberates toxic gases and vapors in an uncontrolled manner, and these are entrained by the solid residues out of the gas purification installation when the hoppers are discharged. These gases and vapors liberated uncontrollably definitely represent major safety problems. Finally, the solid residues must be loaded by mechanical shovels onto wagons or lorries which transport them to an intermediate storage area in order, as required, to be subjected to an additional handling operation before recycling. It is clear that this discontinuous handling of the solid residues is an unhygienic, polluting and expensive practice. Furthermore, the mode of removal described hereinabove has the major disadvantage of not profitably using the considerable heat energy still contained in the solid residues at the output of the gas purification installation in a recycling operation.

It might naturally be thought to use continuous transport systems for granular or pulverulent products which are known per se, especially open mechanical conveyors (for example conveyor belts), mechanical conveyors integrated in closed pipes (for example Archimedes screws) and pneumatic conveyors. A priori, the above mentioned systems seem however, to create more problems than they solve. Open conveyors in no way eliminate the problems of pollution, cleanliness and safety linked with the dust, gas and vapors liberated during handling of the solid residues. Mechanical conveyors integrated in closed pipes might, being leak-tight systems, solve the problem of the liberation of dust, gas and vapors but, for reasons of cost, it is nevertheless inconceivable to use such systems over larger distances. As regards pneumatic conveyors, they lack reliability, because they risk becoming blocked when the solid residues are moist, which leads to significant cleaning work before they can again be restarted. Now, in the case of blast furnace gases, it is necessary to provide, inside the gas purification installation, for certain operating regimes of the blast furnace, partial condensation of the water vapor contained in the gases. This naturally leads to moistening of the solid residues collected in the hopper of the filter. This moistening of the solid residues can also result from an operation of adjusting the temperature of the blast furnace gases upstream of the filter, which is carried out by an injection of water. It must also be borne in mind that any transport system using a closed mechanical conveyor or a pneumatic conveyor can present serious risks of explosion if the gases entrained by the solid residues include combustible gases.

Another factor to be taken into account is the abrasive properties of the blast furnace dust. This is, in fact, dust with a relatively coarse particle size (of the order of one millimeter), which is composed of particles of high hardness.

It is apparent that there is a great need to provide a reliable method of continuously removing these solid residues, which at the same time, controls and eliminates the risks of such an operation. The risks are safety, cleanliness, and avoidance of pollution. In addition, the efficiency of the operation should not be compromised when the solid residues being removed are moist. The economic benefits of such a method and device for the removal of granular or pulverulent solid residues from a gas purification installation, especially blast furnace gases is obvious.

SUMMARY OF THE INVENTION

The above-discussed and other problems and deficiencies of the prior art are overcome or alleviated by the method and device for removing solid residues from a gas purification installation of the present invention. In accordance with the present invention, a method and device for removing solid residues from a gas purification installation is provided which comprises the following five steps and/or equipment: (1) The discharge of a batch of solid gas purification installation residues through a discharge pipe into at least a first closed vessel; (2) the isolation of this first closed vessel with respect to the gas purification installation by leak-tight closure of the discharge pipe, when the discharge operation is finished; (3) passing at least one pressurized purge gas through the solid residues contained in this first closed vessel, so as to create a static or fluidized bed, for the solid residues in this first closed vessel; (4) controlled removal of this purge gas from the first closed vessel; and finally (5) progressive removal of the solid residues from the first closed vessel into a transport pipe, followed by transport of the solid residues through this transport pipe in suspension in a pressurized gas.

In accordance with the method provided, the solid residues to be removed from the gas purification installation are first discharged into a first closed vessel. This first closed vessel is then isolated with respect to the gas purification installation and a pressurized purge gas is blown into the solid residues in order to create, in the first closed vessel, a static or fluidized bed of the solid residues. In this manner, the gases and the vapors trapped between the solid particles are liberated and mixed with the purge gas. The purge gas mixture is then removed in a controlled manner together with the gases and vapors out of the first closed vessel.

It will be noted that the particles in suspension in the static or fluidized bed are exposed to a very large surface area for contact with the purge gas. In this manner, it is possible to carry out, if required, optimal transfer of heat energy from the gaseous medium to the solid residues. This heat exchange provides the latent heat necessary for the evaporation of volatile substances, such as water, which impregnate the solid residues. The method in accordance with this invention consequently makes it possible to carry out, in an efficient manner, not only controlled elimination of the gaseous substances entrained by the solid residues, but also drying of the moist solid residues and coreroiled elimination of the vapors thus produced.

The purge operation produces, as output, solid residues which are ideally prepared to be transported by a pneumatic conveyor in suspension in a second pressurized gas. The fact is that the solid residues are separated from all the toxic and/or explosive gases possibly entrained by the solid residues when leaving the aforementioned gas purification installation. Furthermore, the solid residues have, if required been sufficiently dried in the static or fluidized bed and no longer present any risk of binding in the moist state. Finally, the granular or pulverulent solid particles no longer form a compact mass, but are already at least partially in suspension in a gas.

The toxic, explosive and/or polluting gases and vapors separated from the solid residues and diluted in a suitable purge gas, can be removed in a controlled manner from the first chamber, either to a location where they can be released without risk to humans and/or the environment, or to a post-treatment installation for these gaseous mixtures.

An overpressure in the first closed vessel is advantageously created with the purge gas during the purging. In fact, for the same mass flow rate of purge gas, increasing this overpressure decreases the speed of the gas in the fluidized bed, increases the homogeneity of the fluidization obtained and decreases the risk of entrainment of solid particles. In other words, for a limit speed imposed on the purge gas in the fluidized bed, the increase in pressure in the first closed vessel makes it possible to increase the mass flow rate of the purge gas. It will be noted that this overpresssure in the first closed vessel may be up to a few bar.

The first purge gas blown into the solid residues is preferably an inert gas. In this manner, any risk of explosion from the start up of the method is efficiently eliminated.

If the solid residues are moist, which might lead to binding of the solid particles during the pneumatic transport, the purge gas is preferably a heated gas having a very low relative humidity, e.g. dried and heated air.

The flow rate of the purge gas is preferably kept constant in order to make it possible to keep the purging time constant.

The purge gas is preferably removed through separators which retain the solid particles. It might, however, also be reinjected into the gas purification installation upstream of the solid particle separator of the gas purification installation.

If it is desired to obtain continuous operation of the pneumatic conveyor, without interruption during operations of charging and purging the first closed vessel, it is, for example, possible to work with a second closed vessel installed downstream of the first closed vessel. In this case, the solid residues are discharged, after the passage of the purge gas or gases, into the second closed vessel where they are at least partially held in suspension in a pressurized gas, to be removed by pneumatic transport from this second closed vessel, which constitutes a kind of buffer tank for the pneumatic conveyor.

Alternatively, it is also possible to provide a second closed vessel identical to the first and installed in parallel with the first closed vessel. The second closed vessel is charged and the solid residues are purged and/or dried, when the solid residues are removed by pneumatic transport into the second closed vessel, and vice versa.

It will be noted that continuous operation of the pneumatic conveyor may be advantageous from the point of view of optimizing the pneumatic transport energy and from the point of view of the final use of the solid residues.

The present invention also provides a device for removing granular or pulverulent solid residues from a gas purification installation, especially blast furnace gases comprising the following elements: (1) a first closed vessel forming a pressure receptacle, (2) a discharge pipe connected between the gas purification installation and the first closed vessel, (3) an isolation member, leak-tight to the gases, integrated in the discharge pipe, (4) a fluidization surface arranged in the first closed vessel so as to make it possible to blow a gas through the solid residues from the bottom to the top, (5) at least one gas supply source connected to the blowing surface and dimensioned to deliver a gas with a flow rate and a pressure which is sufficient to create and sustain a static bed or fluidized bed of the solid residues above the blowing surface (6) a gas removal pipe connected to the closed vessel and fitted with an isolation member, (7) a pipe for removing the solid residues, connected to the closed vessel and fitted with an isolation member and (8) a pneumatic conveyor connected in a leak-tight manner to the pipe for removing the solid residues.

It will be noted that the overpressure in the first closed vessel is preferably kept constant using two Laval nozzles, one of which is placed between the fluidization surface and the gas supply source, and the other is integrated in the gas removal pipe.

The device used for implementing the method provided is subjected to intense wear by the granular or pulverulent solid residues, which are removed from the gas purification installation. In numerous cases, especially in the case of blast furnace gases where these solid residues comprise iron ore and coke dust with a relatively coarse particle size (of the order of one millimeter), these residues are in fact highly abrasive and produce when they are moved at high speeds, a high degree of abrasion phenomena in the device used for implementing the method provided.

Means to significantly reduce the wear as discussed in the preceding paragraph of this discharge pipe that is between the gas purification installation and the first closed vessel is provided in accordance with the present invention. This means is in accordance with the framework of the method described hereinabove and is as follows. Before starting the discharge of the batch of solid residues into the first closed vessel and during its discharge proper, adjustment of the pressure prevailing in the first closed vessel is made so as to limit the pressure difference between the gas purification installation and the first closed vessel.

This limiting of the pressure difference between the gas purification installation and the first closed vessel makes it possible to limit the speed of flow of the solid residues in the discharge pipe itself and downstream of the discharge pipe, which naturally greatly reduces abrasion in these regions.

In this context, it should be pointed out that the gas purification installation is normally in significant overpressure with respect to the atmosphere, whereas the first closed vessel is, before the discharge of the batch of solid residues, normally under atmospheric pressure. The adjustment of the pressure prevailing in the first closed vessel comprises, in this case: a) before starting the discharge of the batch of solid residues into the first closed vessel, controlled injection of a pressurized gas into the first closed vessel in order to establish therein a pressure substantially equal to the pressure prevailing in the gas purification installation;

b) during the discharge operation proper, controlled decompression of the first closed vessel by controlled removal of a flow rate of gas from the first closed vessel, maintaining in the first closed vessel a pressure slightly less than the pressure prevailing in the gas purification installation.

During the discharge operation proper, the flow rate of the residues flowing in the first closed vessel is measured and the flow rate measured is compared with an upper limit value. The pressure in the first closed vessel is then adjusted as a function of the measured flow rate of the solid residues, such that the pressure in the first closed vessel is increased if this measured flowrate exceeds the upper limit value.

The great reduction of wear at the pneumatic conveyor and its supply device in accordance with the present invention and method described hereinabove is accomplished as follows:

a) during the progressive removal of the batch of solid residues from the first closed vessel into the transport pipe, detection of a minimum filling level of the first closed vessel is provided;

b) if this minimum filling level is detected, interruption of the removal of the batch of solid residues from the first closed vessel and leak tight isolation of the transport pipe with respect to the first closed vessel is made; and c) adjustment of the pressure in the upstream part of the transport pipe is made by injection of a pressurized gas, so as to follow a pressure curve which decreases with time during progressive removal of the solid residues from the transport pipe in suspension in the pressurized gas.

The detection of a minimum filling level of the first closed vessel makes it possible to avoid the creation of a short-circuit of the gases through the bulk of the remaining solid residues. The isolation of the transport pipe with respect to the first closed vessel efficiently prevents the large volume of pressurized gas contained in the first closed vessel from being able to influence the speed of emptying of the transport pipe. The decreasing pressure curve is then advantageously determined such that the speed of the solid residues in the transport pipe, which speed would tend to increase during the emptying operation, does not exceed a limit speed.

It will be appreciated that this procedure makes it possible to empty the transport pipe completely, but without thereby reaching, towards the end of this emptying operation, excessively high speeds which would inevitably lead to rapid destruction of the transport pipe by abrasion phenomena. The operation of emptying the transport pipe in accordance with the method and invention described hereinabove is carried out during the operation of alecompressing the first closed vessel and/or during the operation of discharging the following batch of solid residues from the gas purification installation into the first closed vessel and/or during the operation of purging this batch of solid residues in the first closed vessel. By operating in this way, it is possible to start the operation of removing the solid residues from the first closed vessel into a transport pipe which is completely empty, and thus to prevent blockages of the transport pipe.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
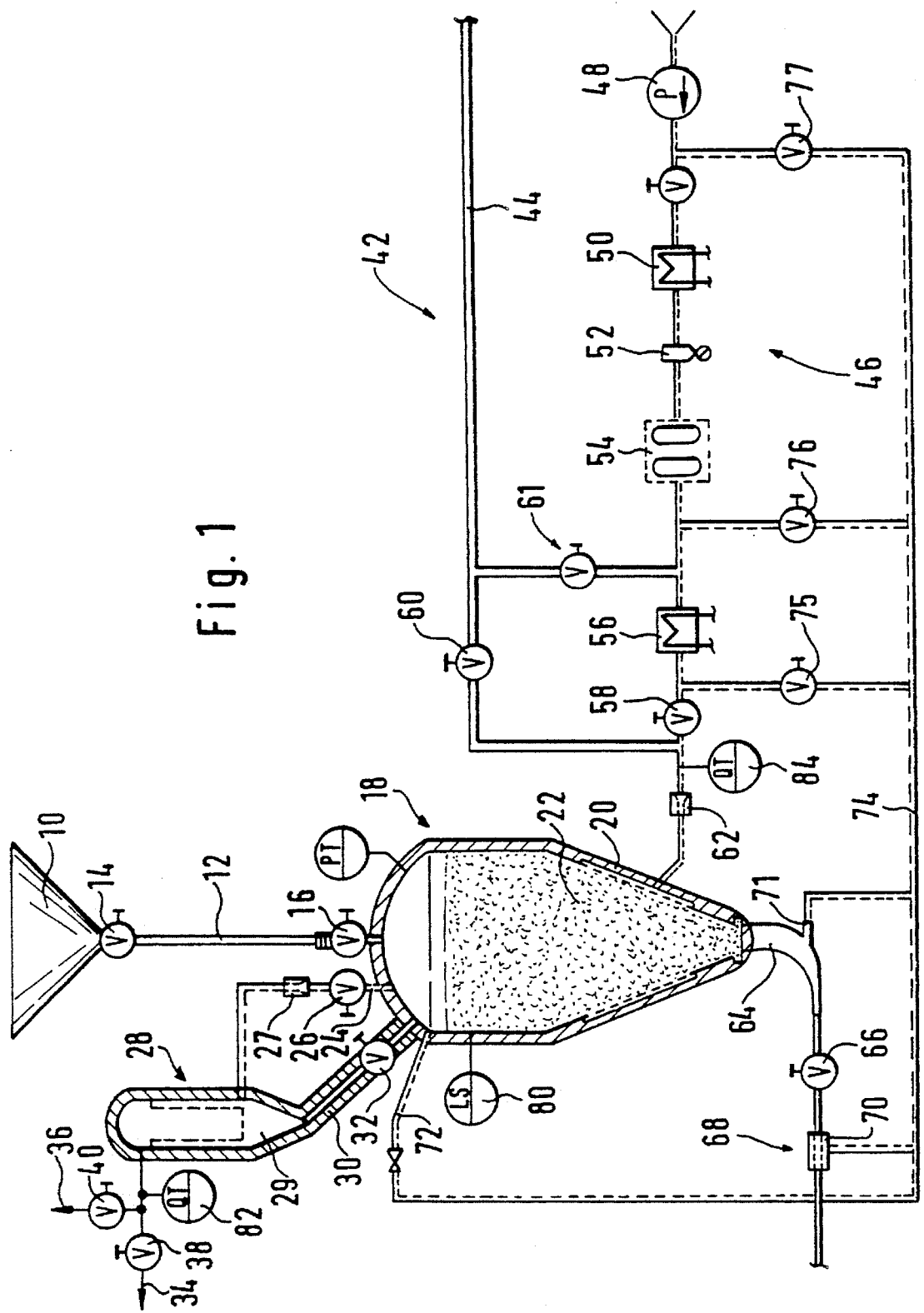
FIG. 1 is a block diagram of an installation making it possible to implement the method of the present invention.

Referring first to FIG. 1, the method and device for removing solid residues from a gas purification installation is generally represented by the entire FIG. 1. In FIG. 1, reference 10 labels a hopper installed below a solid particle separator (not shown) of a blast furnace gas purification installation. This hopper 10 receives the solid residues separated by the separator of the blast furnace gas. It will be noted that these blast furnaces gases comprise toxic gases such as CO, $SO_2$ and greater or lesser quantities of water vapor. The solid residues mainly consist of coke, carbon and iron ore dust, and consequently constitute a primary material which can usually be recycled in an agglomeration installation or directly reinjected into the blast furnace.

A discharge pipe 12, equipped upstream with a closure member 14 for the solid residues and downstream with an isolation valve 16 which is leak tight to the gases, joins the hopper 10 to a closed vessel 18. The closed vessel 18 constitutes a thermally isolated pressure receptacle, into which the discharge pipe 12 emerges at its upper part. At its lower part, the vessel 18 is equipped with a fluidization device 20 making it possible to blow a gas in from below, through the solid residues discharged into the closed vessel. The fluidization device 20 consists, for example, of a peripheral surface 22 which is permeable to the gases and delimits on the lower part of the vessel 18 the storage space for the solid residues. In FIG. 1, this permeable peripheral surface 22 defines most of a pouring cone of the vessel 18.

A purging or decompression pipe 24, which is fitted with an isolation valve 26, leak tight to the gas, leaves from the upper part of the closed vessel. This purging pipe 24 is preferably connected to a solid particle separator, for example a bag filter 28. A hopper 29, connected below the filter 28 discharges through a discharge pipe 30 which is fitted with an isolation valve 32, leak tight to the gas, into the vessel 18. The purge gases filtered by the filter 28 are removed through removal pipes 34, 36, each fitted with an isolation valve 38, 40 which is leak tight to the gas. A Laval nozzle 27 integrated in the purging pipe 24 makes it possible to carry out these purging and drying operations at high pressures and therefore to increase the mass flow rate of the purge gas without entraining the solids.

A gas supply source is given the overall reference 42. In the case represented in FIG. 1, this supply source comprises a pipe 44 for supplying an inert gas, for example nitrogen, and an installation for generating dry air, labelled overall by the reference 46. This air generator 46 comprises, for example, an air compressor 48, an air cooler 50, followed by a water separator 52, optionally an additional air drier 54 for after drying of the air and an air heater 56. The air generator 46 consequently makes it possible to create a flow of pressurized air whose relative humidity is very low.

Through the isolation valves 58 and 60 it is known to connect either the inert gas pipe 44 or the air generator 46 to the fluidization device 20. The fluidization device 20 is supplied with gas preferably by a supersonic flow through a Laval nozzle 62, which makes it possible to fix the gas flow rate at a defined value.

The lower end of the vessel 18 emerges in a device for removing the solid residues, preferably a device for removal by fluidization, for example, a fluidization bend 64. This removal device emerges through an isolation valve 66 in a pneumatic transport pipe 68. The fluidization bend 64, the upper part of the vessel 18, as well as a post-fluidization station 70 are supplied with gas through a pipe 74 connected to the gas supply source 42.

The operation of the device described hereinabove in accordance with the present invention can be summarized as follows:

The discharge pipe 12 makes it possible, by opening the isolation valve 16, then the closure member 14, to discharge under gravity the solid residues from the hopper 10 into the closed vessel 18. When the closed vessel is filled to a certain height, which is detected by a level detector 80, the closure member 14, which is first closed, in the discharge flow, is opened. The isolation valve 16, leak tight to the gas, is next closed. During charging of the vessel 18, at least one of the purging valves 36 and 38 and the isolation valve 26 are opened in order to allow decompression of the vessel 18 during its charging.

The valve 60 is then opened in order to supply the fluidization device 20 with a constant flow of an inert gas. This flow of gas is blown from below through the solid residues to create a static bed or a fluidized bed of solid particles. It should be noted that the fluidization obtained in the vessel 18 will not necessarily be homogeneous, which is, however, not a major disadvantage. The important factor is that as few compact blocks of solid residues as possible remain, that is, those compact blocks of solid residues that are passed through by the inert gas.

The inert gas, which entrains the gases and vapors contained in the vessel 18 and trapped in the solid residues, is removed through the pipe 24, and the filter 28 into one of the purging pipes 34 or 36. In the filter 28, the gas mixture is separated from the entrained solid particles. Since the flow rate of inert gas set up in the closed vessel 18 is constant, it can be estimated that, after a predetermined time interval, the elimination of the gaseous substances and of the vapors is almost completely finished.

The valve 58 is then progressively opened and the valve 60 is closed in parallel, until the static or fluidized bed is entirely supported by a flow of hot and dried air produced by the gas generator 46. This flow of hot, dried air replaces the flow of inert gas as the purge gas and causes, in the static or fluidized bed or permeable peripheral surface 22, evaporation of the water possibly impregnating the solid particles. This results in the removal of this water in the vapor phase through one of the pipes 34, 36. It will be noted that the representation of two pipes 34 and 36 indicates that it is, for example, possible to remove the purge air at a different place from the inert purge gas. Instead of using preheated air, it might naturally be possible also to preheat the inert gas, which is made possible by the bypass 61.

The degree of dryness of the solid residues in the vessel 18 can be controlled continuously, for example using measurements of relative humidity and of temperature carried out on the flow of air at the output at 82 and on the flow of air at the input at 84. When the solid residues are dry enough to prevent any risk of binding of the solid particles, the main purging valve 26 and the purge gas supply valves 58, 60 are closed. The valve 66 at the inlet of the pneumatic conveyor and one of the valves 75, 76 or 77 are opened. In the fluidization bend 64, a flow of the fluidized solid residues is created in the direction of the pneumatic transport pipe 68. Complementary fluidization of this flow is made possible by the introduction at 70 and at 71 of air withdrawn from the pipe 74. A pipe 72, connected to the pipe 74, makes it possible to maintain, in the supper part of the vessel 18, the pressure necessary to ensure the flow of the solid residues in the fluidization bend 64.

It is, of course, also possible to inject, in a preventative manner, a flow of inert gas into the pneumatic transport pipe 68, when there is a fear of an explosive mixture of combustible dust and air in the pneumatic transport pipe 68. This is, for example, the case just after opening of the valve 66 and possibly towards the end of the operation of emptying the vessel 18; that is to say, when the density of solid particles in suspension in the air is still low. After establishment of the working fluidized flow in the conveyor 68, the risk of explosion of dust is, however, reduced, because the proportion of combustible dust is much greater with respect to the oxygen contained in the transport air. In this stage of the method, an explosion of dust in the conveyor 68 is no longer to be feared, and the inert gas can be entirely replaced by air.

When the vessel 18 is completely emptied, the isolation valves 66 and 75 or 76 or 77 are closed. The valve 26 and at least one of the purging valves 38, 40 are opened. After decompression, the valve 32 is opened to discharge the contents of the hopper 29 from the filter 28 through the pipe 30 into the vessel 18 and the operations are resumed as described hereinabove.

Figure 2:
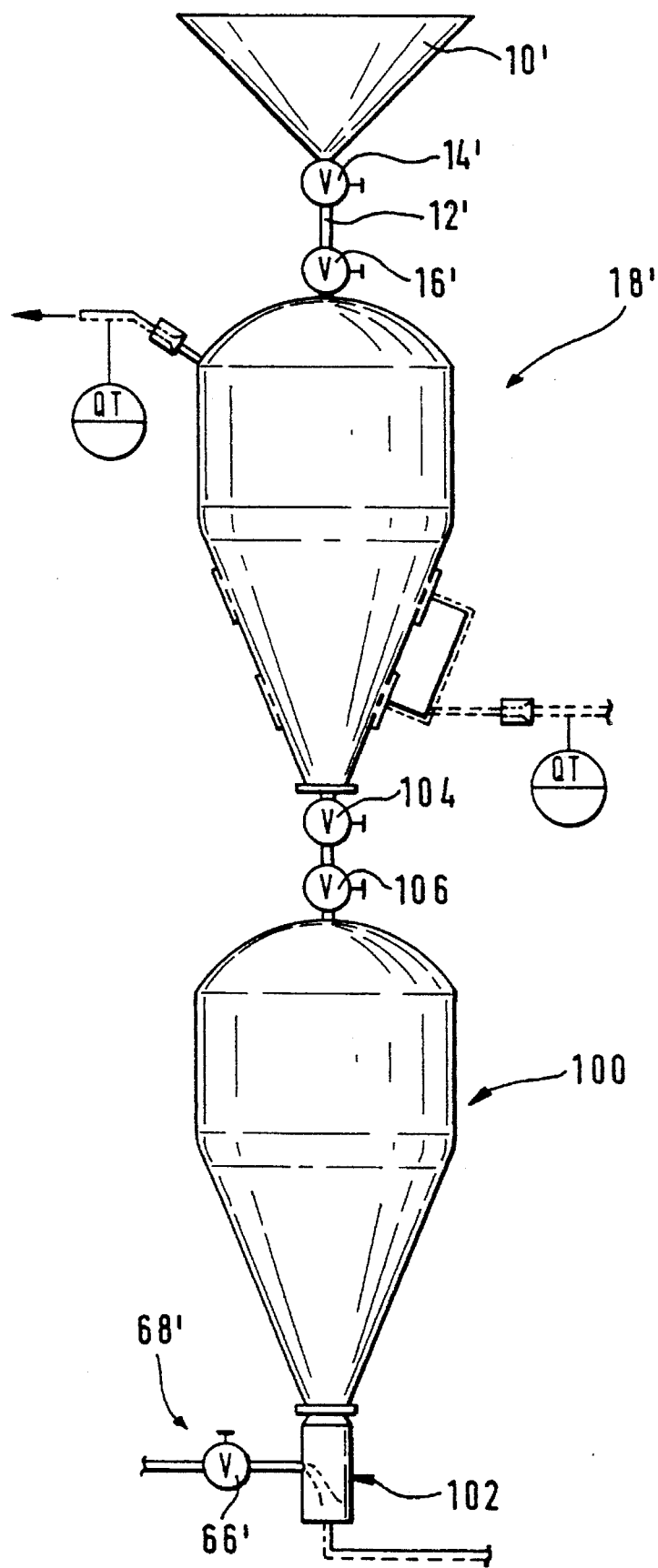
FIG. 2 is a first embodiment of a variation of the present invention.

FIG. 2 represents a first alternative embodiment which makes it possible to operate the pneumatic transport 68' without interruptions due to the operations of charging and purging the closed vessel. In this embodiment, the closed vessel 18' is equipped in a manner similar to the vessel 18 in FIG. 1 (all the equipment not, however, being represented in FIG. 2). The difference between the installation in FIG. 1 and the installation in FIG. 2 essentially resides in the connection of the vessel 18' to the conveyor 68'. This connection is, in fact, no longer made through a fluidization bend, but through a buffer tank 100 which itself also constitutes a pressure tank. The buffer tank 100 is equipped at its base with a conventional fluidization device which supplies the pneumatic conveyor 68'. The valves 104 and 106 make it possible to isolate the buffer tank 100 from the vessel 18' during the charging and purging operations which take place in vessel 18' into the buffer tank 100, the operation of the conveyor 68' need not be interrupted.

Figure 3:
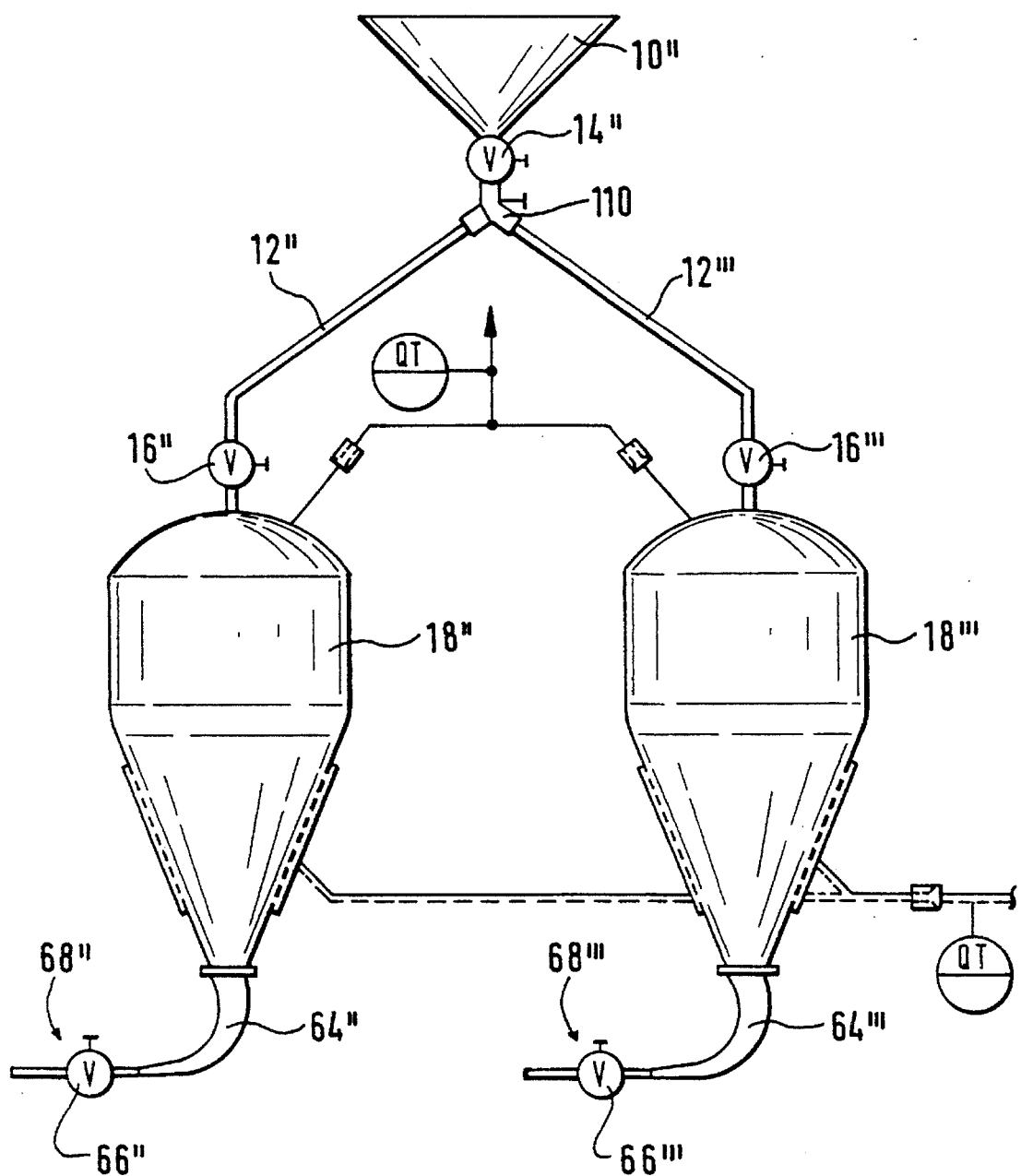
FIG. 3 is a second embodiment of a variation of the present invention.

FIG. 3 represents a second alternative embodiment making it possible to supply a final user continuously. This embodiment comprises two closed vessels 18" and 18'" which are identical and equipped in the same manner as the closed vessel 18 shown in FIG. 1 (this equipment not being shown in FIG. 3). A three-way valve 110 is mounted downstream of the closure member 14" and makes it possible to direct the solid residues collected in the hopper 10" either through a pipe 12" into the closed vessel 18", or through a pipe 12'" into the closed vessel 18'". Each of the pipes 12" and 12'" is fitted with its own isolation valve 16" and 16'", leak tight to the gas. The closed vessel 18" is corrected through a fluidization bend 64''', fitted with an isolation valve 66''', to a first pneumatic conveyor 68'''. The closed vessel 18''' is connected through a fluidization bend 64'''', fitted with an isolation valve 66'''', to a second pneumatic conveyor 68'''' connected further on to the conveyor 68'''. It will be noted that the closed vessel 18'' will deliver into the conveyor 68''', when the operations of charging and purging take place in the closed vessel 18''', and vice versa.

Figure 4:
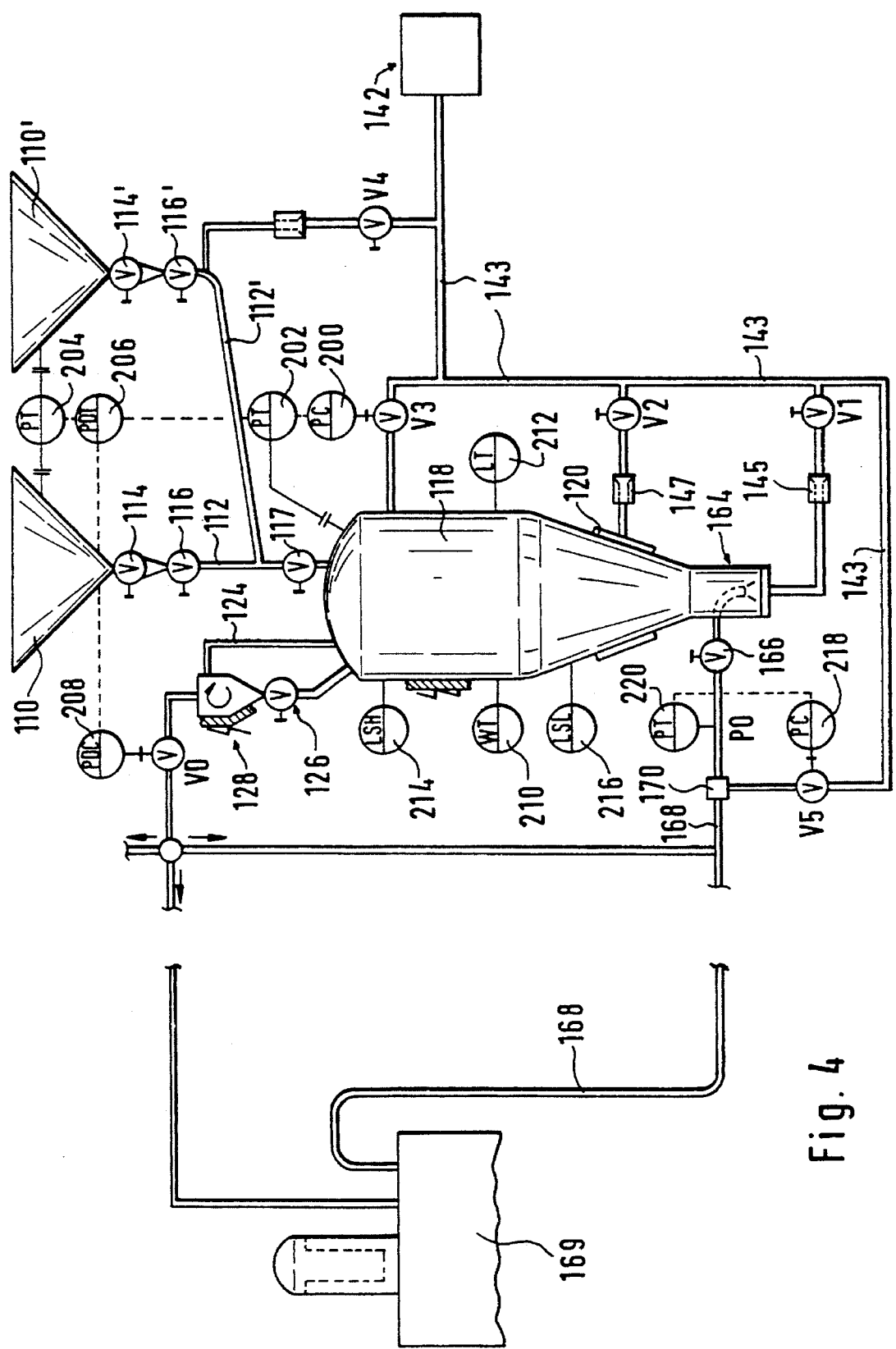
FIG. 4 is a block diagram of an installation, similar to that in FIG. 1, equipped with additional regulation systems.

In FIG. 4, the references 110 and 110' label two hoppers installed below a solid particle separator of a blast furnace gas purification installation. A discharge pipe 112 or 112' joins these two hoppers 110 and 110' to a closed vessel 118. The closed vessel 118 is generally situated at a lower level than the hoppers 110 and 110'. Each of these discharge pipes 112, 112' is equipped with a closure member 114, 114', in order to retain the solid residues, and with an isolation valve 116, 116', leak tight to the gas, to isolate the closed vessel with respect to the gas purification installation.

As regards the description of the closed vessel 118, it is made with reference to FIG. 1. Thus, it will simply be noted that the reference 120 labels a fluidization device for creating a static or fluidized bed in the vessel 118, reference 124 a decompression pipe, reference 128 a solid particle separator equipping the decompression pipe 124. It will also be noted that, in the case of FIG. 4, the solid particle separator 128 is a cyclone separator. A decompression valve 126 equips the decompression pipe 124 downstream of the solid particle separator 128. The solid particle separator protects the decompression valve 126 against the abrasive effect of the solid residues which are inevitably entrained at high speeds in the decompression pipe 124 with the gases removed from the closed vessel 118.

Behind the decompression valve 126, the gases can, for example, be released into the atmosphere or be injected into a pneumatic transport pipe or a tank, on condition that the back pressure in the tank is not too high.

A pressurized gas supply source is labelled by the reference 142. As for the detailed description of such a source, reference is also made to FIG. 1. This pressurized gas supply source is connected to a main distribution pipe 143.

A first gas supply valve $V_1$, preferably followed by a Laval nozzle 145, is connected between the main gas distribution pipe 143 and a fluidization pot 164, which is known per se and which forms the lower part of the closed vessel 118. A second gas supply valve $V_2$, preferably followed by a Laval nozzle 147, is connected between the main gas distribution pipe 143 and the fluidization device 120. A third gas supply valve $V_3$ is connected between the main gas distribution pipe 143 and the upper part of the closed vessel 118. A fourth gas supply valve $V_4$, preferably followed by a Laval nozzle 149, is connected between the main gas distribution pipe 143 and the upstream part of the discharge pipe 112'.

The fluidization pot 164 is connected to a pneumatic transport pipe 168, which emerges, for example, in a tank 169. This pneumatic transport pipe 168 is fitted, in immediate proximity to the fluidization pot 164, with an isolation valve 166, leak tight to the gases. A pressurized gas injection device 170 is integrated in the transport pipe 168, downstream of the isolation valve 166, and in immediate proximity thereto. The pressurized gas injection device 170 is connected through a gas supply valve $V_5$ to the main gas distribution pipe 143.

The operation of the device described hereinabove in accordance with the present invention can be summarized as follows.

Before the discharge of a batch of solid residues into one of the two hoppers 110, 110' into the closed vessel 118, the decompression valve $V_0$ on the decompression pipe 124, the gas supply valves $V_1$, $V_2$, $V_3$ and $V_4$ and the isolation valve 166 on the transport pipe 168 are closed. The pressure in the closed vessel 118 is most often less than the pressure in the hoppers 110, 110'.

The first operation then consists in substantially equalizing the pressures between, on the one hand, the hoppers 110 and/or 110' and, on the other hand, the closed vessel 118. This operation is carried out, for example, using the gas supply valve $V_3$, which is slaved for this purpose to a pressure regulator 200. Pressure regulator 200 receives as input signals the pressure in the closed vessel 118 ( which is measured by a pressure sensor 202) and the pressures in the hoppers 110 and/or 110' (which are measured by a pressure sensor 204); or the difference between the pressures measured in the closed vessel 118, on the one hand, and the hoppers 110 and/or 110', on the other hand. This differential pressure signal is for example supplied directly by the unit 206.

The second operation consists in opening the valves 114, 116 and 117, or 114', 116' and 117, in order to open the discharge pipe 112, or 112'. The solid residues can now flow under gravity from the hopper 110 into the closed vessel 118. In the case of the hopper 110' which is for example further from the closed vessel 118, the gas supply valve $V_4$ is preferably opened to inject a propellent gas into the discharge pipe 112'. This will, above all, be the case if the distance between the hopper 110' and the closed vessel 118 is greater and/or if the height available for a flow under gravity of the solid residues in the pipe 112' is small.

During the discharge of the solid residues into the closed vessel 118, the pressure in the closed vessel 118 necessarily rises. The decompression of the closed vessel 118 is governed by the decompression valve $V_0$, which is slaved to a pressure regulator receiving as input signal the difference in pressure between the hoppers 110, 110', on the one hand, and the closed vessel 118 on the other hand. If this pressure difference becomes too small, or if the pressure in the closed vessel 118 itself becomes greater than the pressure prevailing in the hoppers 110, 110', the valve $V_0$ is further opened, allowing decompression of the closed vessel 118 through the purging pipe 124.

The degree of filling of the closed vessel 118 is monitored by a weight sensor 210 and/or a continuous level sensor 212 and/or a top level sensor 214. If the top filling level of the closed vessel 118 is reached, the closed vessel 118 is isolated with respect to the hoppers 110, 110' by closing the valves 114, 116 and 117, or 114', 116' and 117, thus terminating the discharge operation.

An operation of purging the batch of solid residues discharged into the closed vessel 118 can now follow. This operation is carried out by opening the gas supply valve $V_2$ and by injecting the purge gas or gases via the fluidization device 120 through the solid residues. A static and/or fluidized bed is thus created in the closed vessel 118. The pressure regulator 208 of the decompression valve $V_0$ now advantageously tolerates an increase in the pressure in the closed vessel 118 to a level greater than the pressure prevailing in the hoppers 110 and/or 110'. It has, in fact, been observed that the efficiency of the purging operation increases if the pressure increases.

With the purging operation finished, the decompression valve $V_0$ is closed. The gas supply valve $V_1$ is opened to inject a fluidization gas into the fluidization pot 164; then the isolation valve 166 on the transport pipe 168 is opened to communicate the fluidization pot 164 with the transport pipe 168. Using the adjustment valve $V_3$, it is now possible to increase the pressure above the solid residues in the closed vessel 118, which makes it possible to remove the fluidized solid residues from the fluidized pot 164 into the pneumatic transport pipe 168.

When the level of the solid residues in the closed vessel 118 falls, the gas supply valve $V_3$ keeps the pressure above the solid residues substantially constant, until the moment when a level detector 216 detects the reaching of a low level of solid residues in the closed vessel 118. This low level is chosen so as to avoid the creation of a short circuit of the gases through the remaining bulk of the solid residues. The gas supply valves $V_1$, $V_2$ and $V_3$ and the isolation valve 166 on the transport pipe 168 are now closed. At the same time, the gas supply valve $V_5$, which is integrated in a slaved system comprising a pressure regulator 218 and a pressure sensor 220, starts to adjust the pressure at the point $P_0$ which is situated directly upstream of the isolation valve 166. For this purpose, the regulator 218 follows, while adjusting the pressure to the point $P_0$, a pressure curve which decreases in time during the operation of emptying the transport pipe 168. Such an adjustment curve p(t) at the point $P_0$ is represented, solely by way of illustration, on the left hand diagram in FIG. 5.

The more the transport pipe 168 is emptied, the more the head loss to be compensated for decreases. This phenomenon is represented on the right-hand diagram in FIG. 5. The length of the transport pipe 168 is represented on the abscissa. The abscissa X=O represents the location of the point $P_0$. The head losses between the mouth L and the various points $X_i$ on the pipe are represented on the ordinate. These head losses are calculated for a maximum allowable speed in the least favored section of the transport pipe 168. In other words, this speed is chosen so that the transport pipe 168 undergoes no intolerable abrasion phenomena in this least favored section.

The left hand diagram is substantially identical to the right hand diagram, with the exception that the times ti at which the rear front of the solid residues in the transport pipe 168 passes to the various locations $X_i$ on the transport pipe 168 are now represented on the abscissa, and the pressure p(t) which it is necessary to have at the point $P_0$ to obtain the maximum allowable speed in the transport pipe 168 is represented on the ordinate. In other words, if the regulator 218 is made to follow the curve represented in the left-hand diagram in FIG. 5 during the emptying of the pipe 168, complete emptying of the pipe 168 is achieved in a reasonable time without the risk of having, during the final phase, very high speeds leading to rapid wear of the pipe.

Figure 5:
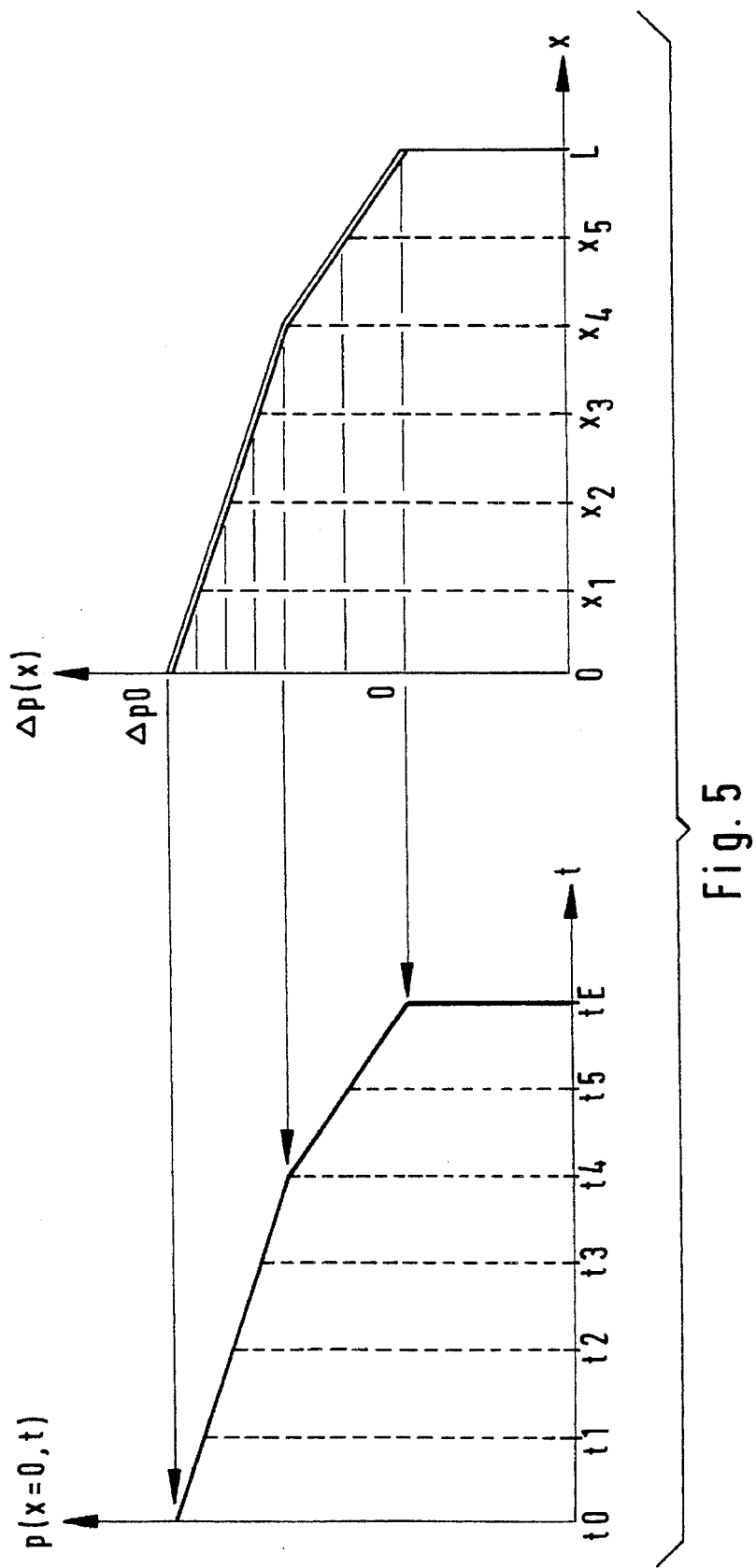
FIG. 5 schematically represents, in two diagrams, the change in the pressure in a pneumatic transport pipe during the operation of emptying this transport pipe.

It is pointed out that the appearance of the curve p(t) will have to be determined individually for each installation. The curve represented in FIG. 5 is obviously only a theoretical example for illustrating the ideas and does not represent a characteristic curve of an actual installation.

Finally, the closed vessel 118 is decompressed in a controlled manner through the purging pipe 124, that is to say at a controlled flow rate. It is obviously possible to interrupt the decompression when the pressure prevailing in the hoppers 110 and/or 110' has been reached in the closed vessel 118. This procedure naturally reduces the flow rate of gas which must be injected into the closed vessel 118 in order to pressurize the closed vessel 118 before opening of the discharge pipes 112 and/or 112'.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for removing granular or pulverulent solid residues from a gas purification installation, comprising the steps of:

discharging a batch of solid residues from said gas purification installation through a discharge pipe into at least one first closed vessel;

isolating said at least One first closed vessel with respect to the gas purification installation by leak tight closure of said discharge pipe subsequent to said discharging step;

passing at least one pressurized purge gas through said solid residues contained in said first closed vessel so as to create and sustain a static or fluidized bed of said solid residues in said at least one first closed vessel;

controllably removing a flow rate of purge gas from said first closed vessel;

progressively (removing) discharging said solid residues from said at least one first closed vessel into a transport pipe; and transporting said solid residues through said transport pipe in suspension in a pressurized gas.

2. The method of claim 1 wherein an overpressure is created with said at least one pressurized purge gas in Said at least one first closed vessel.

3. The method of claim 2 wherein said at least one purge gas comprises an inert gas that is first passed through said solid residues contained in said at least one first closed vessel.

4. The method of claim I wherein said at least one pressurized purge gas comprises a heated gas having a very low relative humidity.

5. The method of claim 4 wherein said heated gas is previously dried air.

6. The method of claim 1 wherein the flow rate of said at least one pressurized purge gas is kept constant.

7. The method of claim 1 wherein said at least one purge gas is removed through solid particle separators.

8. The method of claim 1 including:

adjusting the pressure prevailing in the said first closed vessel, before starting said discharge of a batch of solid residues into the said first closed vessel and during said discharging of a batch, so as to limit the pressure difference between said gas purification installation and the said first closed vessel.

9. The method of claim 8 including:

a) controllably injecting pressurized gas into said at least one first closed vessel before starting said discharge of batch of solid residues into said at last one first closed vessel, so as to establish therein a pressure substantially equal to the pressure prevailing in the gas purification installation; and b) controllably (decompression) decompressing said at least one first closed vessel by controllably removing a flow rate of gas out of the said at least one first closed vessel during the discharging of a batch of solid residues into said at least one first closed vessel, so as to maintain in said first closed vessel a pressure slightly lower than the pressure prevailing in the gas purification installation.

10. The method of claim 8 including:

detecting a minimum filling level of said at least one first closed vessel, during the said progressive (removal)

discharging of said solid residues from said first closed vessel into said transport pipe;

stopping said progressively discharging step of solid residues from said at least one first closed vessel into said at least one transport pipe and isolating, with regard to pressure, said transport pipe with respect to the said at least one first closed vessel if said minimum filling level is detected;

progressively emptying said transport pipe by removing the remaining solid residues from said transport pipe in suspension in pressurized gas; and during said progressive emptying of said transport pipe, adjusting the pressure in the upstream part of the said transport pipe by injection of a pressurized gas, so as to follow a pressure curve which decreases with time.

11. The method of claim 8 wherein an overpressure is created with said at least one pressurized purge gas in said at least one first closed vessel.

12. The method of claim 8 wherein said at least one purge gas comprised an inert gas that is first passed through said solid residues contained in said at least one first closed vessel.

13. The method of claim 8 wherein said at least one pressurized purge gas comprises a heated gas having a very low relative humidity.

14. The method of claim 13 wherein said heated gas is previously dried air.

15. The method of claim 8 wherein the flow rate of said at least one pressurized purge gas is kept constant.

16. The method of claim 8 wherein said at least one purge gas is removed through solid particle separators.

17. The method of claim 8 wherein said at least one pressurized purge gas is delivered to a fluidization surface arranged in said at least one first closed vessel.

18. The method of claim 17 wherein said fluidization surface is connected via a first Laval nozzle to a gas supply source delivering said at least one pressurized gas.

19. The method of claim 8 wherein a flow rate of purge gas is removed from said at least one first closed yesset through a second nozzle.

20. The method of claim 1 wherein said at least one pressurized purge gas is delivered to a fluidization surface arranged in said at least one first closed vessel.

21. The method of claim 20 wherein said fluidization surface is connected via a first Laval nozzle to a gas supply source delivering said at least one pressurized gas.

22. The method of claim 21 wherein a flow rate of purge gas is removed from said at least one first closed vessel through a second nozzle.

* * * * *